United States Patent [19]

Tamano et al.

[11] Patent Number: 5,219,960
[45] Date of Patent: Jun. 15, 1993

[54] PROCESS FOR PRODUCING OLEFIN POLYMER

[75] Inventors: Hideki Tamano; Yuzo Saitoh, both of Oita, Japan

[73] Assignee: Showa Denko K.K., Tokyo, Japan

[21] Appl. No.: 683,157

[22] Filed: Apr. 10, 1991

[51] Int. Cl.⁵ .............................................. C08F 4/30
[52] U.S. Cl. ...................... 526/65; 526/249; 526/254; 526/259
[58] Field of Search .............. 526/65, 249, 254, 259; 525/249, 254, 259

[56] References Cited

U.S. PATENT DOCUMENTS

| | | | |
|---|---|---|---|
| 4,363,901 | 12/1982 | Kikuta et al. | 526/65 |
| 4,492,787 | 1/1985 | Takashima et al. | 525/53 |
| 4,739,015 | 4/1988 | Toyota et al. | 525/249 |
| 4,771,103 | 9/1988 | Chiba et al. | 525/53 |
| 4,808,667 | 2/1989 | Goko et al. | 525/254 |
| 4,820,775 | 4/1989 | Shiga et al. | 525/249 |

FOREIGN PATENT DOCUMENTS

| | | |
|---|---|---|
| 0174863 | 3/1986 | European Pat. Off. |
| 0225099 | 6/1987 | European Pat. Off. |
| 0357394 | 3/1990 | European Pat. Off. |
| 55-115417 | 9/1980 | Japan |
| 57-174311 | 10/1982 | Japan |
| 61-69823 | 4/1986 | Japan |
| 63-41518 | 2/1988 | Japan |
| 63-46211 | 2/1988 | Japan |
| 63-75005 | 4/1988 | Japan |
| 63-75009 | 4/1988 | Japan |

*Primary Examiner*—Joseph L. Schofer
*Assistant Examiner*—Tom Weber
*Attorney, Agent, or Firm*—Sughrue, Mion, Zinn, Macpeak & Seas

[57] ABSTRACT

A process of producing an olefin polymer by polymerizing an olefin in a multi-stage polymerization in the presence of a catalyst composed of a solid catalyst component containing a halogen and titanium, and an organoaluminum compound, while adding, to a reaction vessel for conducting a second-stage or later polymerization or a portion connecting a former part to a latter part, of the multi-stage polymerization reaction vessels, (a) a polyfunctional electron donor compound in an amount, based on the organoaluminum compound, of 0.001 to 50 in terms of the ratio of the total moles of the functional groups to the mole of aluminum, and (b) a compound different from the compound (a) and selected from a compound having a group of the formula M-O-R (wherein M is an element selected from the group consisting of the group IA, IIA, IIB, IIIA, IIIB, IVA, IVB, VA, VB, VIA, VIB, VIIA and VIII elements of the periodic table and R is a hydrogen atom or a hydrocarbyl group), oxygen, carbon monoxide and carbon dioxide, in an amount, based on the organoaluminum compound, of 0.001 to 50 in terms of the ratio of the moles of oxygen atom to the mole of aluminum.

16 Claims, 1 Drawing Sheet

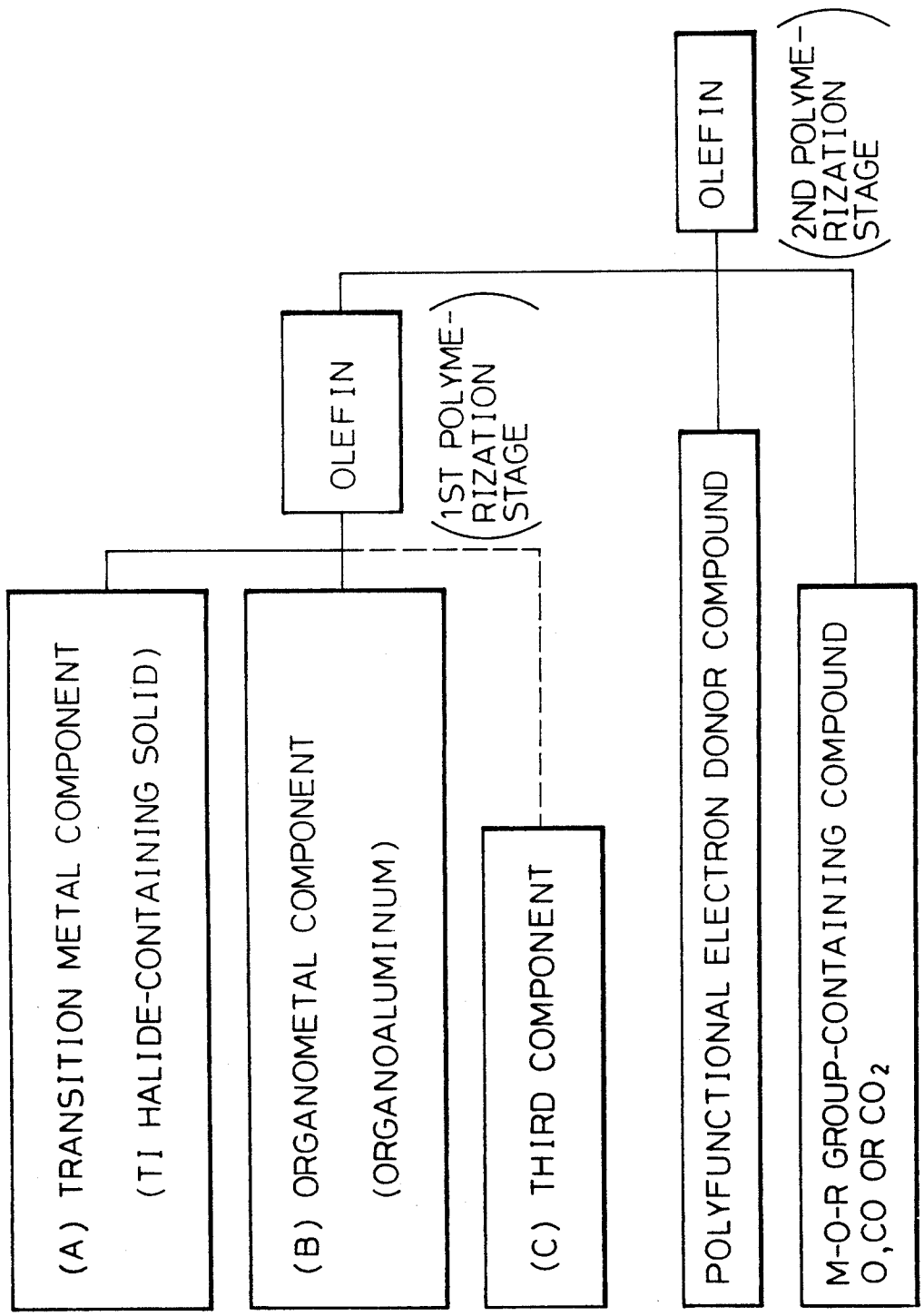

PROCESS FOR PRODUCING OLEFIN POLYMER

BACKGROUND OF THE INVENTION

1. Field of the Invention

The present invention relates to a process for producing an olefin polymer. More specifically, it relates to a process for producing an olefin polymer by polymerizing an olefin or olefins by a multi-stage polymerization in the presence of a catalyst.

2. Description of the Related Art

A process for polymerizing an olefin by a plurality of divided stages is known in the art. One object of the polymerization by a plurality of stages is to broaden the molecular weight distribution or composition distribution of an olefin polymer. In this process, polymers having a different molecular weight or composition ratio are prepared in the respective stages, and then kneaded with each other to prepare a polymer having desired properties. Another object of the polymerization by a plurality of stages is to produce a "propylene-ethylene block copolymer". In general, a homopolymer of a propylene or a propylene copolymer containing a minor amount of another monomer is prepared in the former part, a propylene-ethylene copolymer having a relatively low propylene content and a very highly amorphous polymer component content is prepared in the latter part, and the polymers thus prepared are kneaded with each other to prepare a propylene-ethylene block copolymer having a well balanced impact resistance and rigidity.

The above-described multi-stage polymerization often causes a problem in that the appearance, impact resistance and other mechanical properties of a molded article of a final polymer become poor due to an unsatisfactory compatibility of the polymer prepared in the former part with the polymer prepared in the latter part. The primary cause of the deterioration of the appearance and mechanical properties is considered to be as follows. Specifically, when the polymerization is conducted continuously by using a plurality of reaction vessels connected in series, a distribution of the residence time of the catalyst occurs in each reaction vessel, which often causes catalyst particles having substantially no residence time in the former part to enter the latter part (such a catalyst particle is hereinafter referred to as a "short-cut particle"). Polymer particles prepared in the latter part in the presence of catalyst particles having a residence time in the former part and coated with the polymer prepared in the former part are in a micro state, i.e., the polymer prepared in the former part and the polymer prepared in the latter part are dispersed in a micro state, and thus the above-described problem does not occur. On the other hand, only a polymer in the latter part is prepared from the short-cut particles, which causes a poor dispersion, and thus the above-described problem arises.

The following methods and attempts have been proposed for alleviating the above-described problem.

1) A method wherein a plurality of reaction vessels are provided in the former part of the polymerization and are switched from one to the other at predetermined intervals, to thereby conduct the polymerization substantially in a batch-like manner.

2) An attempt to reduce the amount of "short-cut particles" as a whole through the use of a plurality of stages in series in a portion corresponding to the former part of the polymerization.

3) An attempt to reduce the amount of production of a polymer having a poor dispersibility, through the addition of a reagent for controlling the polymerization activity of the "short-cut particles" in the latter part of the polymerization (see U.S. Pat. Nos. 4,492,787 and 4,739,015, and Japanese Unexamined Patent Publication Nos. 55-115417, 57-174311, 61-69823, 63-41518, 63-46211, 63-75005 and 63-75009).

Among the above-described methods and attempts, the method and attempt described in the above items 1) and 2) require an increase in the amount of equipment needed, whereby the production cost of the resultant polymer is increased, which renders the method and attempt described in the above items 1) and 2) disadvantageous from the viewpoint of profitability.

On the other hand, according to studies made by the present inventors, the attempt described in the above item 3) is useful for a particular catalyst used in the olefin polymerization but has a poor generality or still has an unsatisfactory effect. In particular, the application of this attempt to Ziegler catalysts, especially catalysts for stereospecific polymerization used in the polymerization of, for example, propylene and copolymers having a high adherence, is unsatisfactory, from a practical viewpoint because the effect is poor.

SUMMARY OF THE INVENTION

Accordingly, the objects of the present invention are to eliminate the above-mentioned disadvantages of the prior art and to provide a polymerization process in which the poor appearance of a molded article attributable to the heterogeneity of the formed polymer is not observed, an olefin polymer having excellent properties can be prepared through the elimination of the cause of a lowering of the impact resistance and other mechanical properties, a polymer can be stably produced through the prevention of the adherence of the polymer in the polymerization reaction vessels, and a final polymer having a high amorphous polymer content can be prepared.

Other objects and advantages of the present invention will be apparent from the following description.

In accordance with the present invention, there is provided a process for polymerizing an olefin, comprising subjecting an olefin or olefins to a multi-stage polymerization in the presence of a catalyst composed of a solid catalyst component containing a halogen and titanium and an organoaluminum compound, wherein the polymerization is conducted while adding, to a reaction vessel for conducting a second-stage or later polymerization or a portion connecting a former part to a latter part of the polymerization reaction vessels, (a) a polyfunctional electron donor compound in an amount, based on the organoaluminum compound, of 0.001 to 50, in terms of the ratio of the total moles of the functional groups to the moles of aluminum, and (b) a compound different from the compound (a) and having formula M-O-R (wherein M is an element selected from the group consisting of the group IA, IIA, IIB, IIIA, IIIB, IVA, IVB, VA, VB, VIA, VIB, VIIA and VIII elements of the periodic table and R is a hydrogen atom or a hydrocarbon group, preferably a hydrocarbyl group having 1 to 6 carbon atoms, more preferably an alkyl group having 1 to 4 carbon atoms.) oxygen, carbon monoxide and carbon dioxide, in an amount, based on the organoaluminum compound, of 0.001 to 50 in terms of the ratio of the moles of oxygen atom to the moles of aluminum.

In accordance with the present invention, there is also provided a process according to the above-mentioned item 1 wherein a first polymerization stage is conducted in a monomer composition in such a manner that a polymer comprising not less than 90 mole % of a propylene unit and the balance of a unit of ethylene or an α-olefin other than propylene is provided, and in a subsequent second polymerization stage, ethylene, propylene and an α-olefin other than propylene are polymerized in the presence of the polymer in a monomer composition in such a manner that a polymer comprising 30 to 90 mole % of an ethylene unit, 10 to 70 mole % of a propylene unit and 0 to 8 mole % of a unit of an α-olefin units other than propylene is obtained, and (a) a polyfunctional electron donor compound and
(b) a compound different from the compound (a) and selected from a compound having an M-O-R group, oxygen, carbon monoxide and carbon dioxide is added at the second polymerization stage.

BRIEF DESCRIPTION OF THE DRAWINGS

The present invention will be better understood from the description set forth below with reference to the accompanying drawing of FIG. 1, which schematically illustrates a flow chart of the present polymerization process.

DESCRIPTION OF THE PREFERRED EMBODIMENTS

The present inventors have made extensive and intensive studies with a view to solving the above-described problems, and as a result, have found that a remarkable effect can be attained by adding a certain reagent in the latter part of the polymerization or around a portion connecting the former part of the polymerization to the latter part of the polymerization. The present invention is based on this finding.

The term "polyfunctional electron donor compound" means a compound containing two or more electron donative groups per molecule and having a structure such that the electron donative groups are linked to each other by an inert group. The inert group is a hydrocarbyl group or a halo-substituted hydrocarbyl group having 1 to 10 carbon atoms, preferably 1 to 6 carbon atoms, more preferably 2 to 4 carbon atoms, in terms of the number of the shortest paths and linking individual electron donative groups to each other. An inert group having a large number of carbon atoms is not preferable because the capability of selectively inactivating short-cut particles becomes poor.

The electron donative group possessed by the polyfunctional electron donor compound may be one having an active hydrogen atom or not having an active hydrogen atom. Specific examples of the electron donative group include a primary amino group (—NH₂), a secondary amino group (=NH), a tertiary amino group

a nitrile group (—CN), an imino group

an oxime group (=NOH), a hydrazone group

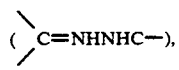

a hydrazide group

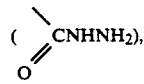

a hydrazine group (—NHNH—), an alcoholic hydroxyl group (—OH), a phenolic hydroxyl group (—OH), a carbonyl group

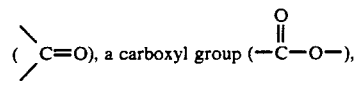

an ether group (—O—), a phosphorus-containing group

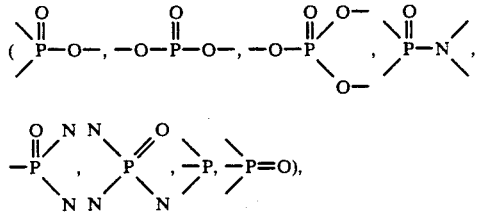

a thinyl group (—SH), a thioether group (—S—), a thionyl group

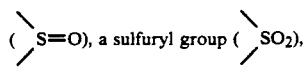

a sulfoxy group (—SO₂—O—). Among the above, a primary amino group, a secondary amino group, a tertiary amino group, an ether group, an alcohol group, a carbonyl group, a thioether group and a thiol group are preferable from the viewpoint of selectivity, and a primary amino group, a secondary amino group, a tertiary amino group, an ether group and a carbonyl group are most preferable.

Specific examples of the polyfunctional electron donor compound include the following compounds:

N,N,N',N'-tetramethyldiaminomethane, ethylenediamine, diethylenetetramine, triethylenetetramine, tetraethylenepentamine, pentaethylenehexamine, N,N,N',N'-tetramethylethylenediamine, N-methylethylenediamine, N,N-dimethylethylenediamine, N,N'- dimethylethylenediamine, trimethylenediamine, tetramethylenediamine, pentamethylenediamine, hexamethylenediamine, polyethyleneimine (average molecular weight: 300 to 1,000,000), monoethanolamine, diethanolamine, triethanolamine, O-ethylethanolamine, N-ethylethanolamine, diethylene glycol, triethylene glycol, polyethylene glycol (average molecular weight: 200 to 60,000), polypropylene glycol (average molecular weight: 200 to 10,000), ethylene glycol dimethyl ether, ethylene glycol diphenyl ether, diethylene glycol diethyl ether, polyethylene glycol monododecyl ether, polyethylene glycol monolaurate, polyethylene glycol mono-p-nonylphenyl ether, o-phenylenediamine, o-aminophenol, acetylacetone and acetonylacetone.

Examples of the compound having an M-O-R group used in the present invention include organic compounds having a C-O linkage, such as ether compounds, an ester of carboxylic acid, an alcoholic compound, a phenolic compound, an acetal compound and an orthoacid compound, organophosphorus compounds having a P-O linkage, organosilicon compounds having a Si-O linkage, organic compounds having a N-O linkage, such as a nitrite compound, organic compounds having a S-O linkage, such as a sulfite compound, halogenated acetyl, and acid anhydride.

Among the above, organosilicon compounds having a Si-O-R group are preferred, and compounds represented by the formula Si $(OR')_m R_n$ wherein R and R' are each a hydrogen atom or a hydrocarbon group, m is 3 or 4 and n is 1 or 0, are most preferred.

Specific examples thereof include tetramethoxysilane, tetraethoxysilane, tetrapropoxysilane, methyltrimethoxysilane, methyltriethoxysilane, ethyltrimethoxysilane, ethyltriethoxysilane, propyltrimethoxysilane, propyltriethoxysilane, phenyltrimethoxysilane and phenyltriethoxysilane.

The catalyst system according to the present invention comprises a solid catalyst component containing a halogen and titanium and as a co-catalyst an organoaluminum compound. If necessary, it is possible to use known electron donor compounds as a third component. Examples of the solid catalyst component containing a halogen and titanium include titanium trichloride, an eutectic mixture of titanium trichloride with aluminum chloride, the titanium trichloride and said eutectic mixture treated with an electron donor compound and a composite compound composed mainly of magnesium and titanium (trivalent or tetravalent) and chlorine. The organoaluminum compounds represented by the following general formulae are generally employed:

$R^1$, $R^2$ and $R^3$ are each selected from a hydrocarbyl group having up to 12 carbon atoms, more preferably an alkyl group having 1 to 8 carbon atoms, a halogen atom (e.g. Br, Cl, I) and a hydrogen atom, provided that one thereof preferably two thereof, is a hydrocarbyl group, and $R^4$, $R^5$, $R^6$ and $R^7$ are each a hydrocarbyl group having up to 12 carbon atoms, more preferably an alkyl group having 1 to 8 carbon atoms.

If necessary, known electron donative compounds may be employed mainly for improving the stereospecificity of the propylene polymer, and examples thereof include tertiary amines, phosphoric amides, ethers, silicates, organic carboxylic esters and phosphoric esters. From the same viewpoint, examples of the electron donor compound used for the treatment include tertiary amines, phosphoric amides, ethers, organic carboxylic esters (including cyclic organic carboxylic esters) and phosphoric esters.

Examples of the composite include one prepared by treating a carrier comprising $MgCl_2$ precipitated from a solution with an electron donor and a titanium compound (for example, as described in Japanese Unexamined Patent Publication No. 58-83006), one prepared by treating, with a titanium compound, a carrier comprising a pulverized mixture of $MgCl_2$ with an electron donor (for example, as described in Japanese Unexamined Patent Publication No. 57-14606), and one prepared by treating, with a titanium compound, a Mg compound precipitated through a reaction (for example, as described in Japanese Unexamined Patent Publication No. 53-24378).

The above-mentioned solid catalyst component, organoaluminum compound and electron donor compound may be separately introduced into a polymerization vessel. Alternatively, two thereof or all thereof may be previously mixed with each other prior to introduction into the polymerization vessel.

The proportions of use of the solid catalyst component, in terms of titanium atom, and the electron donor compound, if used, in the polymerization system are generally 0.001 to 1 mol and up to 10 mol, especially preferably 0.001 to 0.5 mol and up to 7 mol, respectively, based on one mole of the organoaluminum compound.

Examples of the olefin polymerized in the presence of the catalyst system thus prepared include olefins having up to 12 carbon atoms. Representative examples thereof include ethylene, propylene, butene-1, 4-methyl pentene-1, hexene-1 and octene-1. In the practice of the present invention, the above-described olefins may be subjected to homopolymerization. Alternatively, two or more of the olefins may be copolymerized with each other, for example, a copolymerization of ethylene with propylene.

The polymerization can be conducted in any inert solvent or liquid monomer, e.g., olefin. Further, a molecular weight regulator, generally hydrogen, may coexist in the system, for preparing a polymer having a practical melt flow.

The polymerization temperature is preferably $-10°$ C. to 180° C., more preferably room temperature to 130° C., from the practical viewpoint.

According to the present invention, in a process for conducting a multi-stage polymerization of an olefin in the presence of the above-described catalyst system, the above-described polyfunctional electron donor compound and the compound selected from a compound having a M-O-R group, oxygen, carbon monoxide and carbon dioxide are added.

In the multi-stage reaction, the effect of the present invention can be attained by the addition of the above-described compounds to any of the following portions and the vicinity thereof.

i) to a reaction vessel in the latter part of the polymerization;

ii) to a portion connecting a reaction vessel in the former part of the polymerization to a reaction vessel in the latter part of the polymerization; and iii) to a discharge portion in the former part.

The addition in ii) i.e., a portion connecting a reaction vessel in the former part of the polymerization to a reaction vessel in the latter part of the polymerization, is most preferable.

There is no particular limitation on the method of adding the above-described compounds. The polyfunctional electron donor compound and the compound selected from a compound having a M-O-R group, oxygen, carbon monoxide and carbon dioxide may be added separately from each other, or may be previously mixed with each other before addition. Further, the addition may be conducted by any method wherein pure compounds are added as they are, and a method wherein they are supplied in the form of a mixture with an organoaluminum compound as a cocatalyst. The supply in the form of a non-polar solvent solution is preferable from the viewpoint of a stable developing of the effect. Examples of the non-polar solvent include hydrocarbons, for example, propane, propylene, butane, butene, pentane, hexane, heptane, octane, benzene, toluene and xylene.

The polyfunctional electron donor compound is added in an amount, based on the organoaluminum compound, of 0.001 to 50, preferably 0.01 to 10, most preferably 0.05 to 2, in terms of the ratio of the total number of moles of the functional groups to the number of moles of aluminum.

The compound selected from a compound having a group of the formula M-O-R group, oxygen, carbon monoxide and carbon dioxide is added in an amount, based on the organoaluminum compound, of 0.001 to 50, preferably 0.01 to 20, most preferably 0.05 to 10, in terms of the ratio of the number of moles of oxygen atom to the number of moles of aluminum. In both cases, when the addition amounts are less than the above-described ranges, the effect attained is poor, and thus the appearance and impact resistance of the molded article of the polymer become poor and an amorphous polymer is apt to adhere to the wall of the reaction vessel during the production of a propylene-ethylene block copolymer. On the other hand, when the addition amounts exceed the above-described ranges, the reaction rate in the stage in which the compounds have been added becomes so low that the volume of the reaction vessel must be uneconomically increased in order to prepare a polymer having a desired composition. By contrast, in the present invention, the lowering in the activity is small for the amount of use of the electron donor, and in particular in view of conventional knowledge, the activity is surprisingly maintained even in the case of an addition in a molar amount equal to or more than aluminum.

In the production of a copolymer composed mainly of ethylene and propylene, polymerization in a first polymerization stage is conducted in a monomer composition in such a manner that a polymer comprising not less than 90 mole % of a propylene unit with the balance of a unit of ethylene or an α-olefin other than propylene is provided, and in a subsequent second polymerization stage, ethylene, propylene and an α-olefin other than propylene are polymerized in the presence of the above-described polymer in a monomer composition in such a manner that a polymer comprising 30 to 90 mole % of an ethylene unit, 10 to 70 mole % of a propylene unit and 0 to 8 mole % of an α-olefin other than propylene is provided.

In this case, the addition of (a) a polyfunctional electron donor compound and (b) a compound different from the compound (a) and selected from a compound having a M-O-R group, oxygen, carbon monoxide and carbon dioxide in the second polymerization stage in the same manner as described above, in the same amount as described above, enables the adherence of an amorphous polymer to the wall of the reaction vessel to be suppressed while maintaining a required catalytic activity, and at the same time, improves the appearance and impact resistance and other mechanical properties of the molded article of the polymer.

The effect of the present invention is significant when the second polymerization stage, polymerization is conducted in such a manner that a polymer comprising 50 to 85 mole % of an ethylene unit and 15 to 50 mole % of a propylene unit is prepared in a weight ratio of the amount of the polymer formed in the second stage to the amount of the polymer formed in the first stage of 0.05 to 2.0, especially 0.1 to 1.5 and an intrinsic viscosity [$\eta$], as determined in decalin at 135° C., ratio of the polymer formed in the second stage to the polymer formed in the first stage of 0.5 to 10, especially 0.8 to 5.

EXAMPLES

The present invention will now be described in more detail by, but is by no means to restricted to, the following Examples and Comparative Example.

In the Examples and Comparative Example, the MFR was measured according to JIS-K 6758 (230° C.); the flexural modulus of elasticity was measured according to ASTM D-747-61T; the Du Pont impact strength was measured by dropping a weight of 1 kg having a diameter of 12.7 mm from a height of 75 cm on a 2 mm-thick flat sheet prepared by an injection molding of each copolymer; the test temperature was varied, and the flat sheet test was conducted on 10 flat sheets for each 5° C. variation in the temperature to determine a temperature at which 50% of the flat sheets was broken. The appearance test was conducted by measuring the surface gloss of the above-described injection-molded sheet (formed by using a planished mold) according to ASTM-523-66T, and the [$\eta$] value of the polymer produced in the second stage was determined by subtracting the [$\eta$] value of the first-stage polymer from the [$\eta$] value of the second-stage polymer in a weighted average.

EXAMPLE 1

(i) Production of Solid Catalyst Component

A 300 g (3.15 mol) amount of anhydrous magnesium chloride, 1.5 liters of decane and 1.47 liters (9.45 mol) of 2-ethylhexyl alcohol were subjected to a thermal reaction at 130° C. for 2 hr to prepare a homogeneous solution. A 70.0 g amount (0.47 mol) of phthalic anhydride was added to the solution, and they were mixed with each other at 130° C. for 1 hr, while agitating, thereby dissolving phthalic anhydride in the homogeneous solution. The homogeneous solution thus prepared was cooled at room temperature, and the whole quantity thereof was dropwise added to 12.6 liters (113 mol) of titanium tetrachloride kept at −20° C. over a one hour period. After the completion of the dropwise addition, the temperature of the mixed solution was raised to 110° C. over a 4 hr period. When the temperature reached 110° C., 169 ml (0.79 mol) of diisobutyl phthalate was added and the mixture was maintained at that temperature for additional 2 hrs, while agitating. After the completion of the reaction for 2 hrs, solid matter was separated by filtration, resuspended in 200 ml of TiCl$_4$ and again subjected to a thermal reaction at 110° C. for 2 hr. After the completion of the reaction, solid matter was again separated by filtration and thoroughly washed with decane of 110° C. and hexane until no free titanium compound was detected.

This component was subjected to prepolymerization under the following conditions. Hexane (dehydrated and deoxygenated), triethylaluminium and diphenyldimethoxysilane were mixed with each other in that order to prepare a homogeneous solution having an Si to Al mole ratio of 0.2 and 0.1 mol/l of [Al]. The above-described component was added to the homogeneous solution so that the Ti to Al mole ratio was 0.1. Propylene was fed thereto at 5° C. at a rate of 100 g/g Ti·hr, and the feed of propylene was stopped 1.5 hr after the initiation of the feed.

The resultant solid matter was thoroughly washed with hexane at 20° C., and was used as the solid catalyst component.

(ii) 87 kg/hr of propylene, 0.05 g Ti/hr of the solid catalyst component prepared in the above-mentioned item (i), 0.08 mol/hr of triethylaluminum, 0.02 mol/hr of diphenyldimethoxysilane and hydrogen were fed to a reaction vessel having an internal volume of 290 liters and provided with an agitator while adjusting the composition to provide a first stage polymer having an MFR value of 21. The temperature of the contents of the reaction vessel was maintained at 80° C. A bulk slurry polymerization occurred in liquefied propylene as a solvent in the reaction vessel. A part of the reaction mixture was transferred through a connecting tube to a reaction vessel having an internal volume of 145 liters and provided with an agitator. A 0.02 mol/tr amount of tetraethoxysilane and 0.03 mol/hr of ethylenediamine were fed in this connecting portion. An amount of 85 kg/hr of propylene, 12 kg/hr of ethylene and hydrogen were fed in the second stage reaction vessel, and the temperature was maintained at 50° C. An amount of 127 kg/hr of unreacted monomer and 57 kg/hr of copolymer were discharged from the second stage reactor. Separately, a very small amount of sample was taken from the first stage reaction vessel. The results of analysis are given in Table 1.

(iii) Kneading

To the white powder were added 0.1% by weight of butylated hydroxytoluene (BHT), 0.1% by weight of tetrakis[methylene-3-(3',5,-di-tert-butyl-4'-hydroxyphenyl) propionate] methane and 0.1% by weight of calcium stearate, and the mixture was twice passed at 200° C. through a 30 mm$\phi$ extruder, to thereby prepare a pelletized polymer.

(iv) Injection Molding

The pellet prepared in the above item (iii) was passed through a film gate by using a 5-ounce injection molding machine under the following conditions, to thereby prepare a flat sheet having a thickness of 2 mm and a size of 15 cm in the M direction and 11 cm in the T direction.

| Cylinder temperature | |
| --- | --- |
| $C_1$ | 210° C. |
| $C_2$ | 230° C. |
| $C_3$ | 250° C. |
| Nozzle temperature | 220° C. |
| Die mold cooling water | 45° C. |
| Primary pressure | 750 kg/cm² |
| Secondary pressure | 450 kg/cm² |

-continued

| | |
| --- | --- |
| Injection speed | 1.33 cm/sec |

EXAMPLE 2

(i) Production of Solid Catalyst Component

A 300 g amount of diethoxymagnesium, 66.6 g of ethyl 3-ethoxy-2-tert-butylpropionate and 1.5 liter of methylene chloride were added in a nitrogen stream to a sufficiently dried 15-liter round bottom flask. The mixture was agitated under reflux for one hour, and the resultant suspension was transferred under pressure in 12 liter of $TiCl_4$ at room temperature. The temperature of the mixture was gradually raised to 110° C., and a reaction was separated to proceed for 2 hrs, while agitating. After the completion of the reaction, the precipitated solid was separated by filtration and washed three times with 12 liters of n-decane at 110° C. An amount of 12 liter of $TiCl_4$ was newly added thereto, and a reaction allowed to proceed at 120° C. for 2 hrs. After the completion of the reaction, the precipitated solid was collected by filtration and washed three times with 12 liters of n-decane at 110° C. and washed with n-hexane at room temperature until no chloride ion was detected. The titanium atom content of the resultant catalyst component was 3.2%.

This component was subjected to a prepolymerization in the same manner as that of Example 1, to thereby prepare a solid catalyst component.

(ii) A 90 kg/hr amount of propylene, 0.022 g Ti/hr of the solid catalyst component prepared in the above item (i), 0.08 mol/hr of triethylaluminum, 0.02 mol/hr of diisopropyldimethoxysilane and hydrogen were fed to a reaction vessel having an internal volume of 290 liters and provided with an agitator, while adjusting the composition so as to provide a first stage polymer having an MFR value of 21. The temperature of the contents of the reaction vessel was maintained at 80° C. A bulk slurry polymerization occurred in liquefied propylene as a solvent in the reaction vessel. A part of the reaction mixture was transferred through a connecting tube to a reaction vessel having an internal volume of 145 liters and provided with an agitator. An amount of 0.02 mol/hr of tetraethoxysilane and 0.02 mol/hr of diethylenetriamine were fed in this connecting portion. An amount of 311 kg/hr of propylene, 25 kg/hr of ethylene and hydrogen were fed in the second stage reaction vessel, and the temperature was maintained at 50° C. An amount of 371 kg/hr of unreacted monomer and 54 kg/H of copolymer were discharged from the second stage reactor. Separately, a very small amount of a sample was taken from the first stage reaction vessel. The results of analysis are given in Table 1.

The kneading (iii) and injection molding (iv) were conducted in the same manner as in Example 1.

EXAMPLE 3

(ii) A 87 kg/hr amount of propylene, 0.05 g Ti/hr of the solid catalyst component prepared in the above-mentioned item (i) of Example 1, 0.08 mol/hr of triethylaluminum, 0.02 mol/hr of diphenyldimethoxysilane and hydrogen were fed to a reaction vessel having an internal volume of 290 liters and provided with an agitator while adjusting the composition to provide a first stage polymer having an MFR value of 21. The temperature of the contents of the reaction vessel was maintained at 80° C. A bulk slurry polymerization occurred in liquefied propylene as a solvent, in the reaction vessel.

A part of the reaction mixture was transferred through a connecting tube to a reaction vessel having an internal volume of 10 liters and provided with an agitator. A 0.02 mol/hr amount of tetraethoxysilane and 0.03 mol/hr of ethylenediamine were fed in this connecting portion, and the temperature was maintained at 80° C. The output nozzle of this reaction vessel was provided with a discharge valve, and the slurry within the reaction vessel was intermittently discharged therethrough. The solid matter and carrier gas were transferred to a fluidized bed gas phase reaction vessel through the intermittent discharge valve. The inside of the gas phase reaction vessel was maintained at 60° C. by adjusting the temperature of the circulating monomer gas, and the concentrations of ethylene, propylene and hydrogen were adjusted so that the composition of the copolymer was as given in the following table. The total pressure was maintained at 16 kg/cm$^2$. An amount of 57 kg/hr of copolymer was discharged from this reaction vessel, Separately, a very small amount of sample was taken from the first stage reaction vessel. The results of analysis are given in Table 1.

The kneading (iii) and injection molding (iv) were conducted in the same manner as in Example 1.

COMPARATIVE EXAMPLE (i) and (ii): the same procedures as that of Example 1 were repeated, except that the addition of the retarder agent to the connecting portion was omitted.

An amount of 136 g/hr of propylene, 15 kg/hr of ethylene and hydrogen were added to the second stage reaction vessel, and 57 kg/hr of copolymer and 181 kg/hr of monomer were discharged. The resultant copolymer was sticky and had an inferior fluidity compared to that prepared in Example 1.

The kneading (iii) and injection molding (iv) were conducted in the same manner as in Example 1.

TABLE 1

| | Ex. 1 | Ex. 2 | Ex. 3 | Comp. Ex. |
|---|---|---|---|---|
| Analysis copolymer | | | | |
| amount of copolymer (the latter part) (wt. %) | 15.2 | 14.9 | 14.7 | 15.3 |
| amount of propylene in the copolymer (wt. %) | 44 | 45 | 43 | 45 |
| molecular weight [η] (dl/g) | 4.1 | 3.8 | 4.0 | 4.0 |
| whole MFR | 13 | 13 | 13 | 13 |
| Flexual modulus (kg/cm$^2$) | 11500 | 11700 | 11500 | 11500 |
| DuPont impact temp. (°C.) | −44 | −43 | −46 | −6 |
| GLOSS (%) | 83 | 86 | 85 | 58 |

As is clear from the above results, the multi-stage polymerization of an olefin according to the present invention contributes to an improvement in the appearance and impact resistance and other mechanical properties of molded articles of olefin polymers, particularly block copolymers. Further, the appearance of films prepared from these polymers is remarkably improved. Furthermore, in the process of the present invention, the amount of equipment required can be reduced, which renders the process simple and profitable.

We claim:

1. A process of producing an olefin polymer comprising polymerizing at least one olefin in a multi-stage polymerization in the presence of a catalyst composed of a solid catalyst component containing a halogen and titanium and an organoaluminum compound, while adding, to a reaction vessel for conducting a second-stage or later polymerization, or a portion connecting a former part to a latter part, of the multi-stage polymerization reaction vessels,
    (a) at least one polyfunctional electron donor compound in an amount, based on said organoaluminum compound, of 0.001 to 50 in terms of the ratio of the total moles of the functional groups to the mole of aluminum, and
    (b) at least one compound different from said compound (a) and selected from the group consisting of (i) those having a formula M-O-R, wherein M is an element selected from the group consisting of the group IA, IIA, IIB, IIIA, IIIB, IVA, IVB, VA, VB, VIA, VIB, VIIA and VIII elements of the periodic table and R is a hydrogen atom or a hydrocarbyl group, (ii) oxygen, (iii) carbon monoxide and (iv) carbon dioxide, in an amount, based on said organoaluminum compound, of 0.001 to 50 in terms of the ratio of the moles of oxygen atom to the moles of aluminum.

2. A process as claimed in claim 1, wherein a first polymerization stage is conducted in such a monomer composition that a polymer comprising not less than 90 mole % of a propylene unit and the balance of a unit of ethylene or an α-olefin other than propylene is provided and, in a subsequent second polymerization stage, ethylene, propylene and an α-olefin other than propylene are polymerized in the presence of said polymer in a monomer composition in such a manner that a polymer comprising 30 to 90 mole % of an ethylene unit, 10 to 70 mole % a propylene unit and 0 to 8 mole % of a unit of an α-olefin other than propylene is provided, and
    (a) at least one polyfunctional electron donor compound and
    (b) at least one compound different from said compound (a) and
selected from the group consisting of compounds having an M-O-R group wherein M and R are as defined above, oxygen, carbon monoxide and carbon dioxide is added at the second polymerization stage.

3. A process as claimed in claim 1, wherein said polyfunctional electron donor compound is at least one compound selected from those having a primary amino group, a secondary amino group, a tertiary amino group, a nitrile group, an imino group, an oxime group, a hydrazone group, a hydrazide group, an alcoholic hydroxyl group, a phenolic hydroxyl group, a carbonyl group, a carboxyl group, an ether group, a phosphorus-containing group, a thiol group, a thioether group, a thionyl group, a sulfuryl group, and a sulfoxy group.

4. A process as claimed in claim 1, wherein said compound (b) has an M-O-R group wherein M is an element selected from the group consisting of P, Si, N, S, C, Ge, B and Al and R is an alkyl group having 1 to 6 carbon atoms.

5. A process as claimed in claim 1, wherein said compound (b) having an M-O-R group is a compound having an Si-O-R group wherein R is as defined above.

6. A process as claimed in claim 1, wherein said solid catalyst component is selected from the group consisting of titanium trichloride, an eutectic mixture of titanium trichloride and aluminum chloride, the titanium trichloride and the above eutectic mixture treated with an electron donor compound, a composite compound composed mainly of magnesium, trivalent or tetravalent titanium, and chlorine.

7. A process as claimed in claim 1, wherein said organoaluminum compound is at least one compound selected from the group consisting of organoaluminum compounds having the formulae:

$$Al\, R^1\, R^2\, R^3$$

$$R^4\, R^5\, Al\text{-}O\text{-}Al\, R^6\, R^7$$

wherein $R^1$, $R^2$, and $R^3$ independently represent a hydrocarbon group having 1 to 12 carbon atoms, a halogen atom and a hydrogen atom, provided that at least one group represents a hydrocarbyl group, and $R^4$, $R^5$, $R^6$, and $R^7$ independently represent a hydrocarbyl group having 1 to 12 carbon atoms.

8. A process as claimed in claim 1, wherein said catalyst comprises a composite composed mainly of magnesium, trivalent or tetravalent titanium and chlorine and an organoaluminum compound.

9. A process as claimed in claim 8, wherein said catalyst further comprises an electron donor compound as a third component.

10. A process as claimed in claim 1, wherein the functional group of said polyfunctional electron donor compound (a) is at least one group selected from the group consisting of a primary amino group, a secondary amino group, a tertiary amino group, an ether group and a carbonyl group, said compound (b) is a compound having an Si-O-R group wherein R is as defined above, and a catalyst further comprising an electron donor compound.

11. A process as claimed in claim 1, wherein the compounds (a) and (b) are added to a portion connecting the former reaction vessel and the later reaction vessel.

12. A process as claimed in claim 1, wherein the total moles of the functional groups of polyfunctional donor to the mole of aluminum of the compound (a) is 0.05 to 2.

13. A process as claimed in claim 1, wherein the ratio of the moles of oxygen of the M-O-R group containing compounds to the mole of aluminum is 0.05 to 0.

14. A process as claimed in claim 1, wherein the compounds (a) and (b) were added after mixing.

15. A process as claimed in claim 1, wherein the amount of polymer produced in the second polymerization step is 0.05 to 2.0 by weight, based on the amount of polymer produced is the first polymerization step.

16. A process as claimed in claim 1, wherein the ratio of the solid catalyst component in terms of titanium atom and the donor compound is 0.001 to 10 mole.